United States Patent [19]

Kinney, Jr. et al.

[11] Patent Number: 4,548,766

[45] Date of Patent: Oct. 22, 1985

[54] VACUUM FORMABLE WATER COOLING TOWER FILM FILL SHEET WITH INTEGRAL SPACERS

[75] Inventors: Ohler L. Kinney, Jr., Leawood; Donald J. Lillig, Prairie Village, both of Kans.

[73] Assignee: Marley Cooling Tower Company, Mission Woods, Kans.

[21] Appl. No.: 607,684

[22] Filed: May 7, 1984

[51] Int. Cl.$^4$ .............................................. B01F 3/04
[52] U.S. Cl. ............................ 261/112; 261/DIG. 11; 428/179
[58] Field of Search ................. 261/94, 112, DIG. 11, 261/DIG. 72; 428/183, 179

[56] References Cited

U.S. PATENT DOCUMENTS

| | | | |
|---|---|---|---|
| 2,793,017 | 5/1957 | Lake | 261/112 |
| 2,917,292 | 12/1959 | Hittrich | 261/112 X |
| 3,286,999 | 11/1966 | Takeda | 261/30 |
| 3,526,393 | 9/1970 | Meek | 261/112 X |
| 3,540,702 | 11/1970 | Uyama | 261/112 |
| 3,574,032 | 4/1971 | Norback et al. | 261/112 X |
| 3,599,943 | 8/1971 | Munters | 261/112 X |
| 3,617,036 | 11/1971 | Brown | 261/DIG. 11 |
| 3,618,778 | 11/1971 | Benton et al. | 261/112 X |
| 3,733,063 | 5/1973 | Loetel et al. | 261/112 |
| 3,963,810 | 6/1976 | Holmberg et al. | 261/112 |
| 3,965,225 | 6/1976 | Schinner | 261/112 X |
| 4,139,584 | 2/1979 | Holmberg | 261/112 |
| 4,320,073 | 3/1982 | Bugler et al. | 261/112 |
| 4,361,426 | 11/1982 | Carter et al. | 261/112 X |

*Primary Examiner*—Richard L. Chiesa
*Attorney, Agent, or Firm*—Schmidt, Johnson, Hovey & Williams

[57] ABSTRACT

A vacuum formable film fill sheet for crossflow water cooling towers is disclosed having a repeating chevron pattern defining a series of zig-zag, serpentine, spaced ridges on opposed faces of the sheet with the ridges on one face of the sheet defining the grooves on the opposite face thereof and vice versa. The formed sheets are located in upright, horizontally spaced relationship between the overlying hot water distribution basin of the tower and the cold water basin thereof for generally horizontal flow of air past films of water flowing downwardly over the fill sheets. The angularity of the straight ridge sections of the chevron pattern with respect to one another, the vertical height of each repeat pattern, the transverse angularity of the ridges and the spacing between adjacent sheets has been unexpectedly found to provide significantly improved results as compared with prior chevron pattern fill sheets. A series of integral, spaced, transversely W-shaped spacers projecting in opposite directions from each of the sheets have notches in the intermediate V wall portions which complementally receive the outer foot portions of each spacer to maintain adjacent sheets in required horizontally spaced relationship. The spacers are inclined at angles which provide minimum interference with air flow and are oppositely inclined for required complemental interfit with the spacer of an adjacent fill sheet.

20 Claims, 10 Drawing Figures

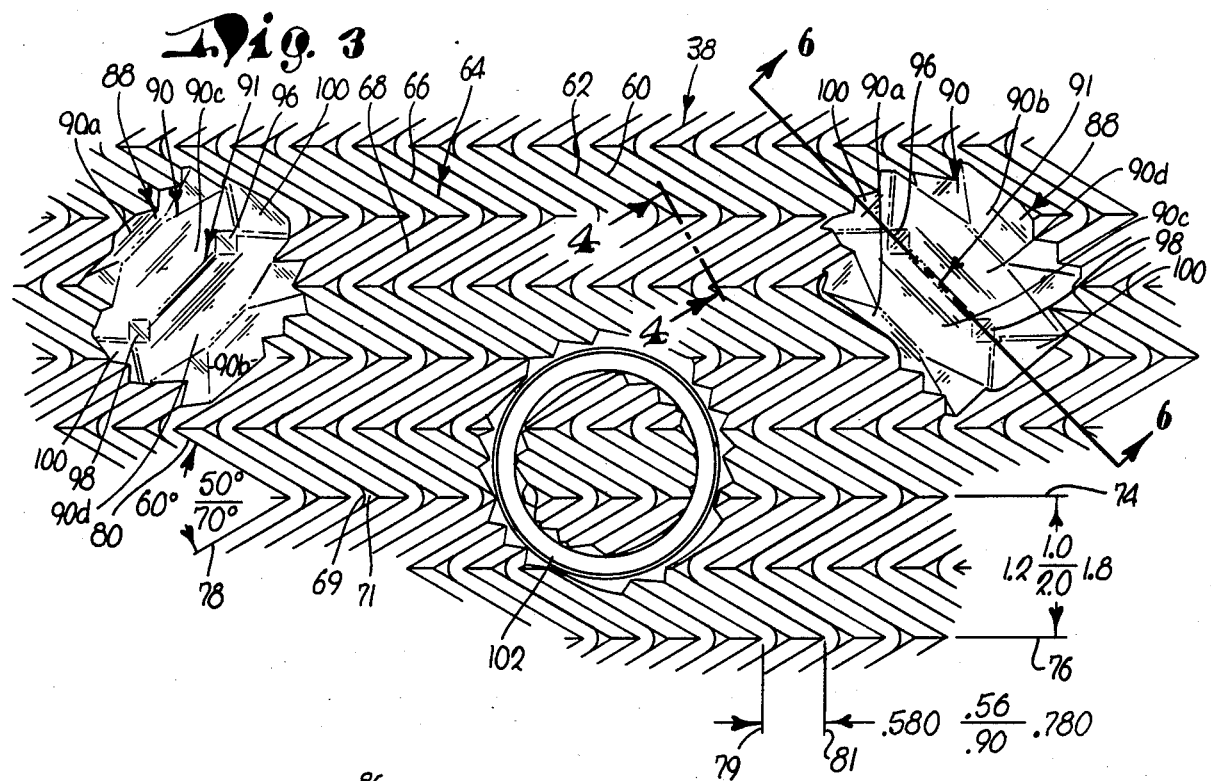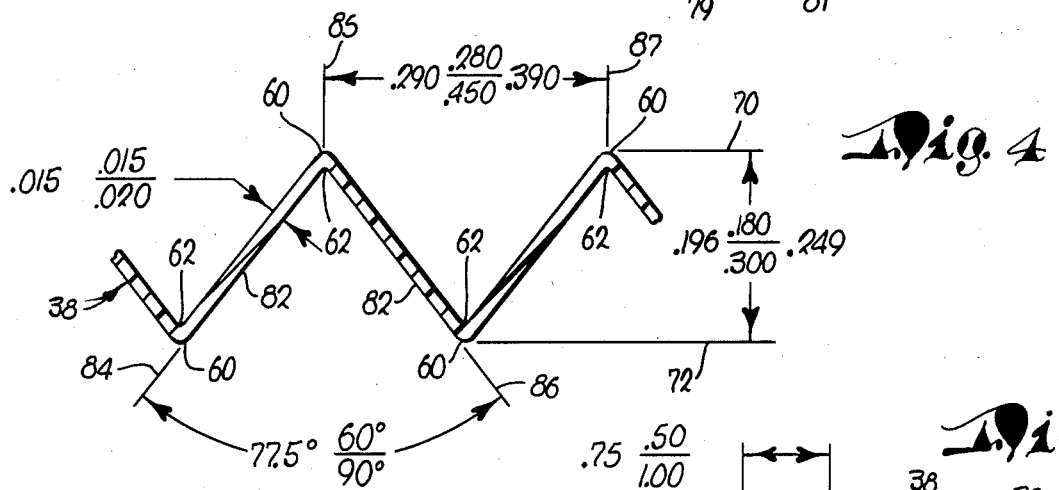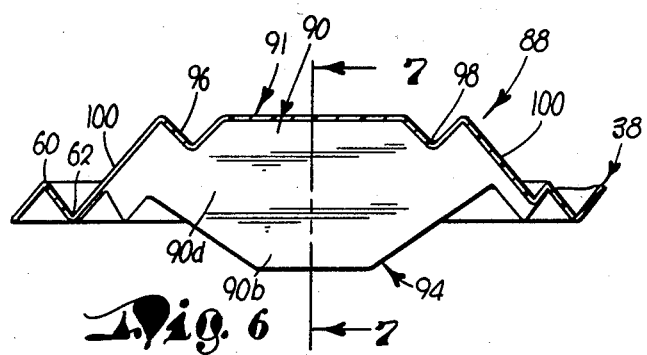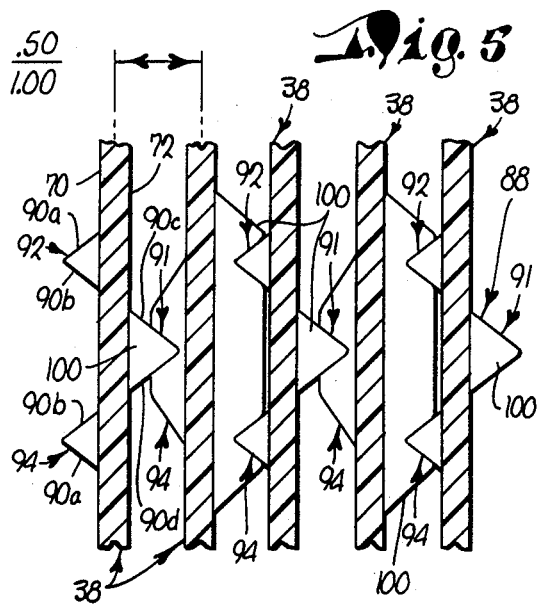

VACUUM FORMABLE WATER COOLING TOWER FILM FILL SHEET WITH INTEGRAL SPACERS

BACKGROUND OF THE INVENTION

1. Field of the Invention

This invention relates to water cooling towers and particularly fill structure for bringing water to be cooled into direct contact with an airstream for evaporative cooling of the liquid.

Cooling towers primarily fall into two principal categories; those involving countercurrent flow of air and water and towers of the crossflow type wherein air flow is essentially perpendicular to the path of water travel. Crossflow towers offer advantages in many instances because of the ability to introduce cooling air across the entire vertical height of the tower casing whereas counterflow towers require that the cooling air be drawn in below the fill assembly. Splash type as well as film type fills have been used in crossflow towers, but excessive static pressure drop has limited the use of film fills in most commercial applications. As a consequence, splash type fill was the heat exchange medium of choice in crossflow towers, especially those categorized as industrial units used in utility and process applications.

In recent years, the energy costs in pumping water to be cooled to a level for delivery into the hot water distribution basin of crossflow cooling towers has become an important factor in overall tower design. The lower the pumping head, the more cost effective the tower operation is from an operating standpoint. However, splash type fill assemblies require an adequate fill volume for cooling efficiency thus presenting a minimum height which dictates indirectly the pumping head for a particular tower configuration.

Therefore, there has been a compelling need for a crossflow cooling tower which retains the inherent advantages of that configuration but which has a minimum pumping head for hot water to be cooled without a deleterious effect on cooling efficiency.

2. Description of the Prior Art

Heretofore, the use of film fill sheets in crossflow cooling towers has largely been limited to smaller towers where the overall size of the tower for shipment as a completed package is an important consideration and the cooling of large volumes of water under varying ambient conditions has not been a controlling design parameter. Efforts to incorporate film fill into large industrial type towers has not met with significant success principally because of the difficulty in obtaining an optimum balance between exposure of water to cooling air without undue static pressure drop. Also, for economics of manufacture and retention of combustion resistant properties, it has been recognized that the fill sheet should be of such nature that it may be fabricated of a synthetic resin such as polyvinylchloride or the equivalent and that construction thereof may be accomplished using straightforward manufacturing techniques and equipment involving minimum tooling costs with maximum product output, as for example by the utilization of vacuum forming techniques conventional in the plastics industry.

One type of film fill heretofore suggested has embodied a chevron pattern formed in the sheet with the fill units disposed vertically for flow of water thereover essentially as a liquid film and with the fill sheets disposed in horizontally spaced relationship for flow of air therepast in crossflow relationship to the water. However, until the present invention, it had been assumed that chevron fill sheets had reached a level of optimization that defied significant further improvement.

To put the importance of the present invention into perspective, it is well known in the cooling tower field that it is beyond practical expectations to make changes in fan design which would use the same horsepower but produce improvement in cooling performance of an order of magnitude approaching percentage levels of as much as about 5% or the like.

An exemplary chevron pattern film fill sheet is depicted in U.S. Pat. No. 3,733,063 issued to the assignee of this application May 15, 1973. In that fill sheet, the chevron pattern consists of a series of serpentine ridges extending from the normally uppermost edge of the fill sheet to the lowermost margin thereof with the chevron sections alternately facing the air inlet and air outlet portions thereof respectively thereby increasing the dwell time of the water as it flows downwardly over the sheet. Integral knobs are provided in the sheet which project outwardly therefrom in opposite directions which function as spacers for maintaining the film fill sheets in proper horizontal spaced relationship when located in pack-defining configuration. In this construction, the knobs located in adjacent aligned relationship were joined by an adhesive to provide a self-sustaining assembly of fill sheets.

Another type of film fill sheet spacer structure of integral construction is shown in U.S. Pat. No. 4,320,073 assigned to the assignee of this application and here again, although the construction has enjoyed substantial commercial usage, relatively close alignment between the sheets in adjacent relationship was required to assure proper inter-engagement of the spacers one to another.

In summary, although the film fill sheets heretofore employed by the assignee hereof embodying a chevron pattern and incorporating spacer knobs or projections as depicted in the patents referenced above, were recognized as significant improvements in the art, use thereof in the field presented certain handling problems either from the standpoint that the packs had to be glued at the point of manufacture or assembled on site with very close spacer alignment being required from sheet to sheet of the pack, and compromises were known to exist in the designs relative to cooling capacity as a function of static air pressure drop attributable to the use of a film type fill as opposed to a splash fill assembly.

U.S. Pat. No. 3,540,702 also depicts a chevron type fill pattern but the sheet itself is bent in a transverse serpentine fashion so that the bent portions of the adjacent sheet may be joined to form a cellular network, U.S. Pat. No. 3,286,999 in FIG. 3b thereof illustrates a fill pattern somewhat similar to that shown in the referenced '063 patent. The disclosure fails to indicate that the chevron pattern should be of critical dimensions or that the sheets should be of a relatively narrow spacing range therebetween.

SUMMARY OF THE INVENTION

It has now been discovered that an improvement in cooling performance in a crossflow water cooling tower may be obtained with a film fill sheet having a chevron pattern formed therein which has been found to exhibit increased cooling performance over fill sheets previously available attributable solely to the configuration of the serpentine ridges formed in the sheet material without an increase in operating costs of the tower such as higher fan horsepower or increased pumping head.

In addition, the present invention provides a film fill sheet which may be vacuum formed at an elevated temperature which simultaneously forms not only the chevron pattern in the sheet material, but also forms a series of transversely W-shaped sheet spacers therein which project outwardly from the outermost opposed faces of the sheet a substantially equal distance so that proper spacing of the sheets if accomplished without the need for extraneous and separate spacer structure. In particular, the spacers are configured such that they interfit and maintain the required spatial relationship between adjacent sheets without the necessity of gluing the sheets together and even though there is slight misalignment from one sheet to another.

BRIEF DESCRIPTION OF THE DRAWINGS

FIG. 3 is a fragmentary, enlarged side elevational view of one side of one of the film fill sheets of the present invention showing the chevron pattern therein, a pair of the transversely W-shaped spacers and a knockout for support members for a fill pack;

FIG. 4 is a fragmentary, enlarged cross-sectional view taken substantially on the line 4—4 of FIG. 3 and looking in the direction of the arrows;

FIG. 5 is a fragmentary, enlarged vertical, cross-sectional view through a portion of one of the film fill packs and better illustrating the sheet spacer structure formed integrally with respective fill sheets to maintain the latter in requisite horizontally spaced relationship;

FIG. 6 is a fragmentary, enlarged view through one of the film fill sheets taken substantially along the line 6—6 of FIG. 3;

DETAILED DESCRIPTION OF THE INVENTION

Figure 1:
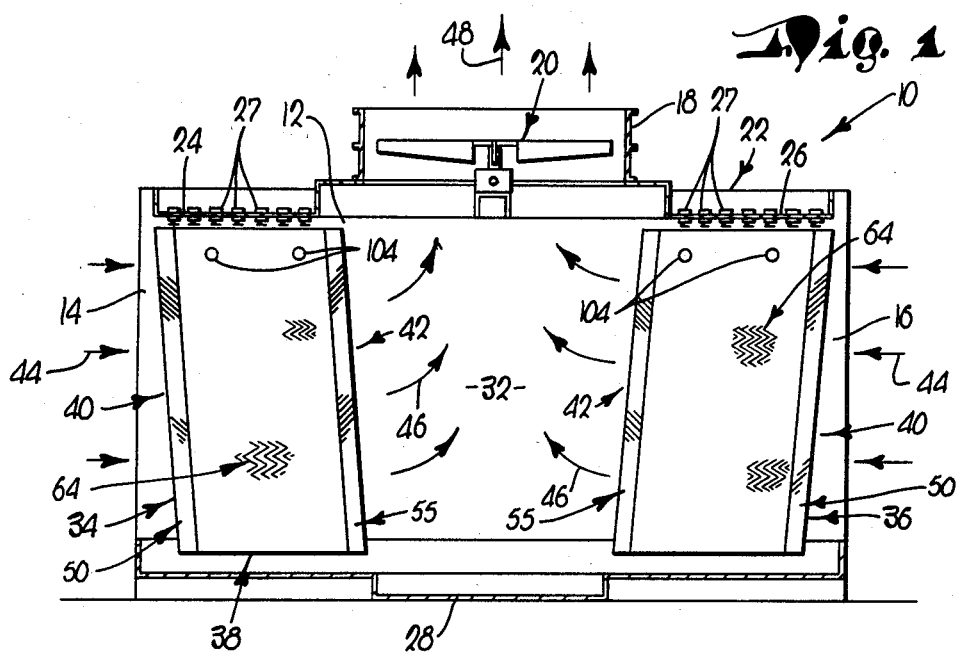
FIG. 1 is an essentially schematic representation of a typical crossflow water cooling tower employing film fill sheet packs embodying the improved fill sheets of the present invention with an opposed flow tower being shown for illustrative purposes only since the film sheets may be used with equal results in a uni-airflow tower.

Referring initially to FIG. 1, a crossflow water cooling tower is depicted in vertical cross-section and generally designated by the numeral 10. As is conventional, tower 10 has a casing 12 which is of generally rectangular configuration and provided with opposed open cooling air inlets 14 and 16, respectively. A centrally located fan cylinder 18 houses a fan assembly 20 rotatable about the vertical axis of cylinder 18. The upper deck 22 of tower 10 defines two hot water distribution basins 24 and 26 on opposite sides of cylinder 18. Basins 24 and 26 have a series of openings therein which receive distribution nozzles 27 which for example may be of the type illustrated in U.S. Pat. No. 3,617,037. Cold water basin 28 underlies the hot water distribution basins 24 and 26 at the lower part of casing 12 on opposite sides of the central hot air plenum 32 and has a depressed central area for water discharge.

A pair of parallelogram-shaped film fill packs 34 and 36 are located on opposite sides of plenum 32 between the hot water distribution basins 24 and 26 the cold water basin 28. The film fill packs 34 and 36 are of identical constructions and thus only one of the same need be described in detail.

Figure 2:
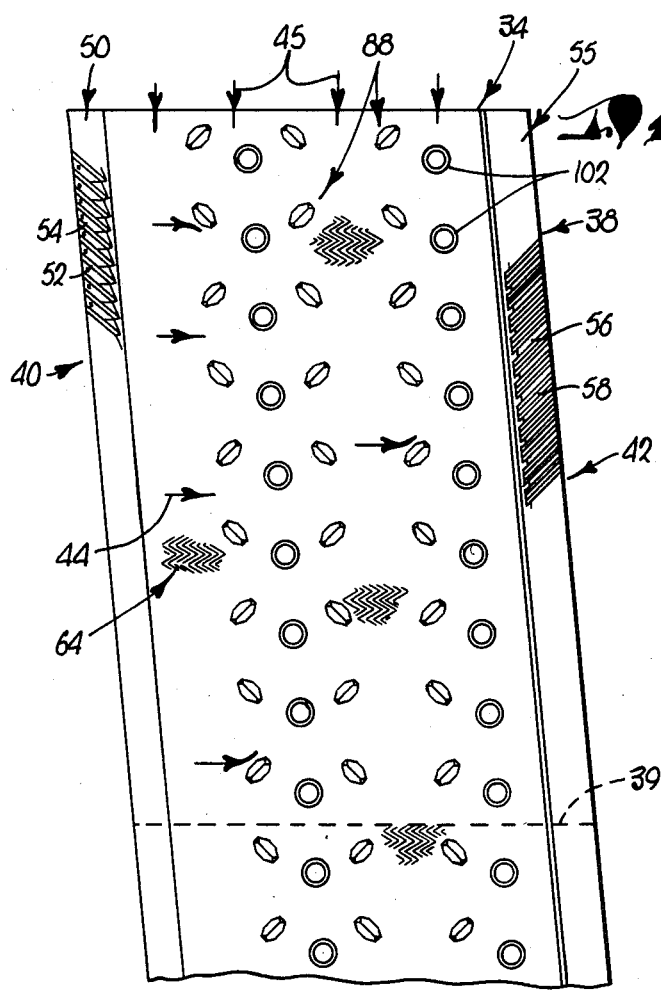
FIG. 2 is a side elevational view of the left-hand film fill pack of FIG. 1 with the normal direction of air flow therepast being illustrated by the horizontal arrows while the normal path of water directed onto the fill pack is indicated by the downwardly directed vertical arrows.

As is best evident from FIG. 2, the film fill pack 34 for example is made up of a series of individual film fill sheets 38 each of which is of integral construction and preferably formed of a synthetic resin material such as polyvinylchloride or the like, using conventional vacuum forming techniques. In preferred practice, PVC sheet material preheated to a level for ready forming thereof is directed over a mold of required configuration having a series of vacuum holes therein. When a vacuum is pulled on the mold, the sheet is pulled down or up as the case may be into complemental engagement therewith. Upon release of the vacuum, the sheet may then be removed from the mold. In a preferred, although not essential manufacturing process, the sheets 38 are formed from a continuous strip of synthetic resin material which is pulled into the vacuum form, then released, the web next stepped through another increment equal in length to the width of the mold, and the procedure repeated thus providing a formed sheet of any desired length. By cutting the formed web into segments (for example along the dotted line 39 of FIG. 2) equal in length to the desired sheets 38 to be fabricated, manufacturing economies are realized.

As viewed in FIGS. 1 and 2, the film fill sheet 38 and thereby the pack 34 presented by a series of such sheets is of generally parallelogram configuration such that when the pack 34 for example is mounted within tower 10, the inlet 40 of the pack 34 is inclined in a direction such that the face thereof recedes from the air inlet 14 as the cold water basin 28 is approached. In like manner, the air discharge face 42 also recedes from the air inlet 14 as the cold water basin 28 is approached. The angularity of faces 40 and 42 is chosen to minimize dry film fill surfaces attributable to pullback of water in respective fill packs 34 and 36 by the air which is pulled through casing 12 by fan assembly 20. As shown in FIG. 1, air pulled in through the air inlets 14 and 16 as indicated by arrows 44 flows through respective fill packs 34 and 36 perpendicular to water flow indicated by arrows 45 and is then turned upwardly toward fan cylinder 18 as depicted by the arrows 46. Vertical discharge of air from cylinder 18 is indicated by the arrows 48.

Returning to FIG. 2, each sheet 38 has a formed inlet segment 50 extending the full length of the sheet 38 and made up of a series of integral, elongated transversely U-shaped valleys 52 and projections 54 which cooperate when the sheets 38 are assembled into packs 34 and 36 to present a series of transversely inclined hexagonal air passages directing air downwardly and away from respective hot water basins 24 and 26.

In similar fashion, the discharge faces 42 of film fill packs 34 and 36 each have an entrained droplet eliminator section 55 made up of integral, formed grooves 56 and projections 58 which cooperate when the sheets 38 are assembled into packs 34 and 36 to define inclined, transversely hexagonal discharge passages directed toward the fan cylinder 18 of the cooling tower 10.

As best shown in FIG. 3, each of the film fill sheets 38 is formed to present an undulating, repeating pattern represented by a series of zig-zag, serpentine, chevron defining spaced ridges 60 on opposed faces of the sheet which define respective complementally configured zig-zag grooves 62 between each adjacent pair of ridges. FIG. 4 makes it clear that the ridges 60 on one face of the sheet 38 define the grooves 62 on the opposite face thereof and vice versa.

The ridges 60 are each made up of a series of end-to-end triangular sections 64 alternately facing in opposite directions from the top of sheet 38 to the lower extremity thereof and having corresponding diverging leg segments 66 and 68 which present a respective interior acute angle therebetween. The leg segments 66 and 68 of each triangular section 64 as seen from the side of sheet 38 depicted in FIG. 3, merge at the interior acute angle zone thereof in the form of an arcuate line 69 which results in generally flat, arrow-shaped areas 71 being defined at the apex of each triangular section 64 which function to increase the rigidity of the formed sheet at points where there might otherwise be a tendency to bend or deform under load, particularly under hot water conditions. It is to be seen though that these arrow-shaped planar areas 71 are at the bottom of the ridges 60 and thereby within the grooves 62 on the face of sheet 38 opposed to that illustrated in FIG. 3. However, such arrow-shaped planar areas may be provided on both faces of the sheet 38 for extra strength if desired.

The ridges 60 and thereby the grooves 62 are of generally triangular configuration transversely thereof (see FIG. 4). It has been discovered that for optimum results, the distance from the outermost portions of one face 70 of a formed sheet 38 to an opposite face 72 thereof (out-to-out dimension) (see FIGS. 4 and 5) should be in the range of about 0.18 inch to about 0.30 inch. The lift of the zig-zag pattern, i.e. the distance from the zone of merger of two leg segments 66 and 68 facing in one direction to the next adjacent zone of merger of two-ridge segments of the same ridge 60 facing in the same direction (see FIG. 3 for reference lines 74 and 76 which indicate the limits of each lift) being from about 1 inch to about 2 inches. The advance of the chevron pattern (indicated by the reference lines 79 and 81 in FIG. 3) is preferably in the range of about 0.56 inch to about 0.90 inch. The interior acute angle defined by diverging leg segments 66 and 68 of each triangular ridge section 64 of each zig-zag ridge 60 is preferably within the range of about 50° to about 70° (see angular reference lines 78 and 80 of FIG. 3).

It has also been found that the included angle between the wall surfaces 82 of each ridge 60, and thereby each groove 62 transversely thereof (indicated by the reference lines 84 and 86 of FIG. 4) should be in the range of about 60° to about 90°, and preferably about 77.5°. However, the distance between the peaks of an adjacent pair of ridges 60 (defined by the references lines 85 and 87 of FIG. 4) should be from about 0.28 inch to about 0.45 inch and preferably from about 0.29 inch to about 0.39 inch.

The sheets 38 are also provided with a series of integral, spaced outwardly directed spacers broadly designated 88 for maintaining adjacent sheets 38 in predetermined spaced, generally parallel relationship as illustrated for example in FIG. 5. Each of the spacers 88 is made up of a series of integrally interconnected wall surfaces 90 which are located in relative disposition causing the spacers 88 to be of generally W-shaped configuration transversely thereof. The outer V-defining wall surfaces 90a and 90b (FIG. 7) extend outwardly from the plane of the ridges 60 on one face of the sheet 38 while the intermediate inverted V-defining wall surfaces 90c and 90d of each spacer 88 extend outwardly beyond the plane of the opposed face of such sheet. It is preferred that the outer leg segments of the transversely W-shaped spacers 88 project outwardly from a corresponding face of the sheet 38 a distance approximately equal to the distance which the intermediate V-defining wall surfaces 90c and 90d project from the opposed face of the sheet.

Figure 8:
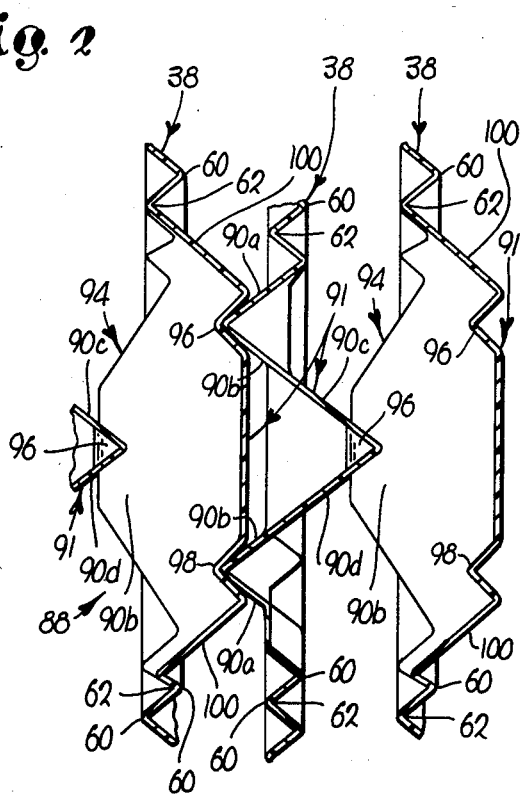
FIG. 8 is an enlarged fragmentary, cross-sectional view through a pack of the film fill sheets at the location of the spacers thereof.
Figure 9:
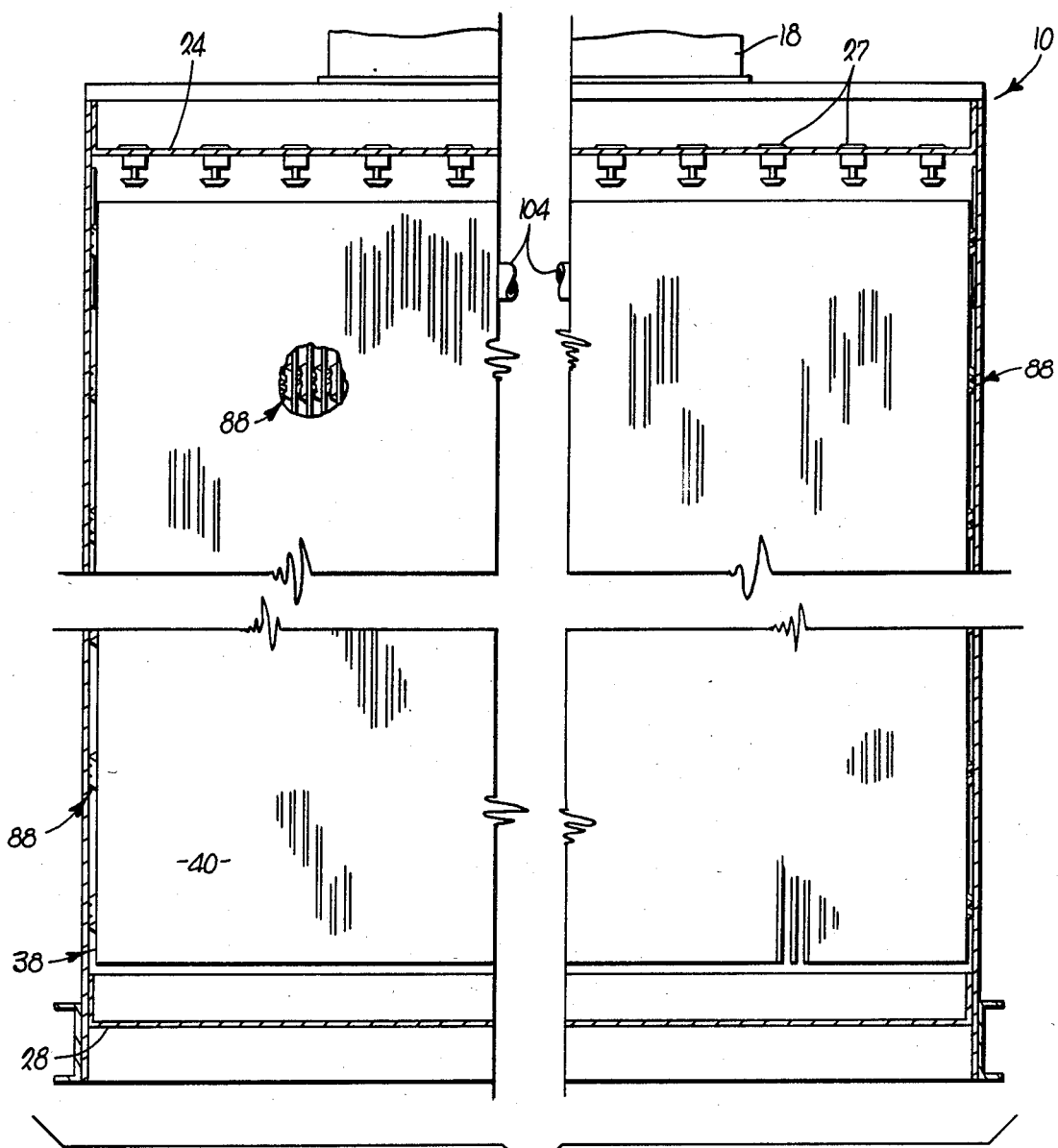
FIG. 9 is a fragmentary, vertical cross-sectional view of one end of the crossflow cooling tower shown in FIG. 1 and illustrating a pack of film fill sheets of the present invention therein.
Figure 7:
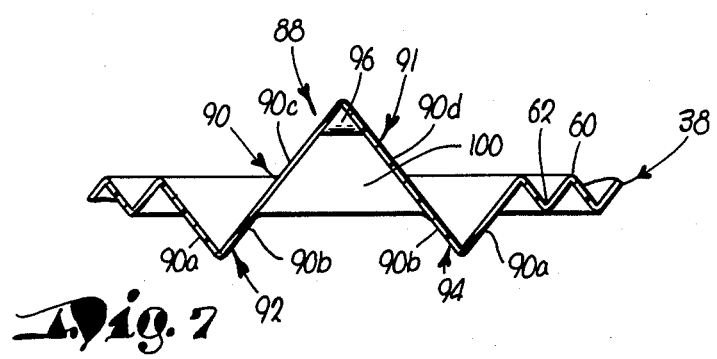
FIG. 7 is a fragmentary, enlarged cross-sectional view taken substantially on the line 7—7 of FIG. 6.

Directing attention to FIGS. 6 and 7, the wall surfaces 90c and 90d which merge to form the intermediate leg 91 of each W-shaped spacer 88 are of greater length longitudinally of the zone of merger thereof than the distance between the zones of merger of wall surfaces 90a and 90b of foot portions 92 and 94 of such W-shaped spacers. The outer, elongated apexes of each leg 91 have triangular, spaced notches 96 and 98 therein which are strategically located and configured to complementally receive the triangular foot portions 92 and 94 of an adjacent spacer 88 as is most evident from FIG. 8.

Integral, transversely extending triangular end wall panels 100 close the extremities of the intermediate, inverted V-defining wall surfaces 90c and 90d at opposed ends of each leg 91.

With reference to FIGS. 2 and 3, it can be seen that the spacers 88 are oriented such that the elongated linear apex of intermediate wall surfaces 90c and 90d defining leg 91 are at an angle with respect to the horizontal as well as the vertical when sheets 38 making up a pack 34, 36 are located in the normal operative disposition thereof. The wall surfaces 90c and 90d of each spacer 88 are at an angle with respect to air flowing horizontally through the fill packs 34 and 36 such that they do not offer undue resistance to crossflowing air. In addition, the spacers 88 are alternately inclined so that adjacent spacers from sheet to sheet of the pack will appropriately match up when the sheets 38 are brought into proximal relationship as is best evident from FIG. 2. Finally, as shown in FIG. 3, the angularity of the apex of the wall surfaces 90c and 90d of each spacer 88 is at an angle with respect to the crossflowing air which is not substantially different from the angle of inclination of adjacent leg segments 66 and 68 of respective triangular section 64 of the serpentine ridges 60 and grooves 62. It is also to be noted from the various drawings illustrating the film fill sheet hereof that the wall surfaces of the spacers 88 merge smoothly into the corrugated pattern of the film fill sheet 38 to minimize eddy currents tending to increase the static pressure drop of the film fill packs 34 and 36 in use thereof.

Each sheet 38 also is preferably provided with a series of integral, circular grooves 102 which interrupt the serpentine pattern of ridges 60 and grooves 62. The grooves 102 are located along parallel, imaginary upright lines at opposite sides of the sheet 38 and function as means allowing convenient knockout of openings in the sheet which may receive tubular supports 104 secured to opposed side walls of casing 12 beneath hot water distribution basins 24 and 26. The tubular supports 104 may serve as the sole means of mounting the fill packs 34 and 36 within casing 12 of tower 10. As can be appreciated, only those circular knockouts are removed from the fill sheets as are required to receive the strategically located tubular supports 104 between opposed casing walls of the tower 10.

DESCRIPTION OF THE PREFERRED EMBODIMENTS

Table I hereunder sets forth parameters of two prior art sheet film fill packs having chevron patterned fill members separated by spacers of the type illustrated in U.S. Pat. Nos. 3,733,063 and 4,320,073, along with preferred parameters of film fill sheet packs embodying the structural and positional characteristics of this invention.

Column 1 of Table I sets out the parameters of the different fill packs. Column 2 indicates the values of a film fill pack which has long been used by the assignee hereof while column 3 defines values of a somewhat different film fill pack more recently placed in use by the assignee, with both of such film fill packs employing sheets having chevron patterns therein with specifically different configurations and positional relationships than have now been found to be critical to optimum cooling performance. Columns 4 and 5 set out values unexpectedly found to be significant in obtaining cooling performance substantially better than heretofore realized with chevron patterned film sheets.

TABLE I

| | M-106 Fill | Sigma Fill | #18 Fill | #22 Fill |
|---|---|---|---|---|
| Out-to-Out Dimension (Inches) | .325 | .153 | .249 | .196 |
| Lift (Inches) | 1.8 | 2.0 | 1.8 | 1.2 |
| Included Angle Triangular Section (Degrees) | 60° | 60° | 60° | 60° |
| Transverse Acute Angle (Degrees) | 77.5° | 90° | 77.5° | 77.5° |
| Ridge-to-Ridge Distance (Inches) | .49 | .3 | .39 | .29 |
| Chevron Pattern Advance (Inches) | .98 | .6 | .78 | .58 |
| Film Thickness (Mils) | .02 | .015 | .015 | .015 |
| Center-to-Center Spacing of Film Fill Sheets in Pack (Inches) | 1.06 | .75 | .75 | .75 |

It has been determined that although the preferred center-to-center spacing of film fill sheets 38 in packs 34 and 36 is 0.75 inch, such spacing may vary from about 0.5 inch to about 1.0 inch. Film thickness may desirably be from about 10 mils to about 30 mils.

Operation of Preferred Embodiments

As briefly alluded to previously, the film fill sheets 38 are preferably formed by sequentially advancing segments of a web of thermoplastic synthetic resin such as polyvinylchloride material through the forming station of a vacuum forming machine with the steps of such operation being equal to the width of the vacuum die in the direction of advancement of the material. The sheets are then severed along a line such as 39 in FIG. 2 to provide a series of sheets which may be assembled into a pack 34 or 36 for installation in tower casing 12. The length of the pack and the effective width thereof is of course a function of the cubic dimensions of the casing 12.

Of particular importance is the fact that the spacers 88 maintain the sheets 38 in desired horizontally spaced relationship without deformation of the individual seats across the horizontal and vertical extent thereof and no secondary spacers are required at the sides of the packs 34 and 36 since the spacers 88 projecting outwardly from corresponding sides of the packs contact the smooth upright side walls of casing 12 throughout the vertical extent of the fill packs. In the past, a problem has been presented by distortion of the fill sheets, initially at the sides of the packs, and as time progresses throughout the packs where the support for such fill units has not been uniform over the entire side areas of the fill assemblies.

In addition, by virtue of the provision of pyramidal spacers having spaced notches therein which receive the foot portions of adjacent spacers, it is not necessary that the film fill sheets 38 be in exact alignment across the width of the fill packs as has heretofore been necessary. Finally, in view of such spacing tolerances inherent in the spacer design of the present invention as previously described, the fill sheets may be assembled into packs 34 and 36 at the tower site and such assembly is not required at the factory as has oftentimes been necessary in the past because of requisite gluing of the conical knobs heretofore used in film fill sheet packs.

The provision of transversely W-shaped spacers 88 of the configuration illustrated and described herein has another inherent advantage in that the draw of such spacers during vacuum forming in opposite directions is substantially equal thus precluding stretching of the material to an extent to cause breakage or separation of the material, particularly at the apexes of triangular areas which would occur using material of the preferred thinness for cost purposes.

Removal of aligned circular areas defined by grooves 102 at the upper part of the sheets 38 making up a pack 34 or 36 allows tubular supports 104 to be passed through such aligned openings for supporting the fill assembly pack in the tower casing in required disposition in underlying relationship to the hot water basins 24 and 26 without additional structural support for such fill unit being required.

As hot water to be cooled is allowed to flow through the distribution nozzles 27 onto the uppermost plan area of respective fill packs 34 and 36, the water spreads out relatively uniformly over opposed faces of each of the sheets 38 and is thereby brought into heat exchange relationship with crossflowing air pulled in through inlets 14 and 16 and then discharged from casing 12 via cylinder 18. The water flowing downwardly over fill sheets 38 tends to form a liquid film layer thereover with the dwell time of such water being increased by virtue of the serpentine path such water must describe in flowing downwardly toward the cold water basin 28.

The out-to-out dimension of each sheet 38, the lift of the chevron pattern, the included angle of the triangular segments of the chevron, the included angle of the pyramidal ridges and the center-to-center spacing of the sheets have all been found to unexpectedly cooperate in providing improved cooling performance over previously available film fill sheet arrangements. Comparative tests conducted to establish the improved results obtained by fabrication and positioning of film fill sheets 38 in accordance with the parameters set out herein have confirmed that with the same size tower and fan and constant fan horsepower, and with the same conditions of hot water temperature (95°), cold water temperature (85°) and wet bulb temperature (78°), an increase in the amount of water cooled is obtained using Fill #18 and Fill #22 referenced in Table I above as compared with previously available fill units as represented for example by the M-106 Fill and Sigma Fill of Table I.

Figure 10:
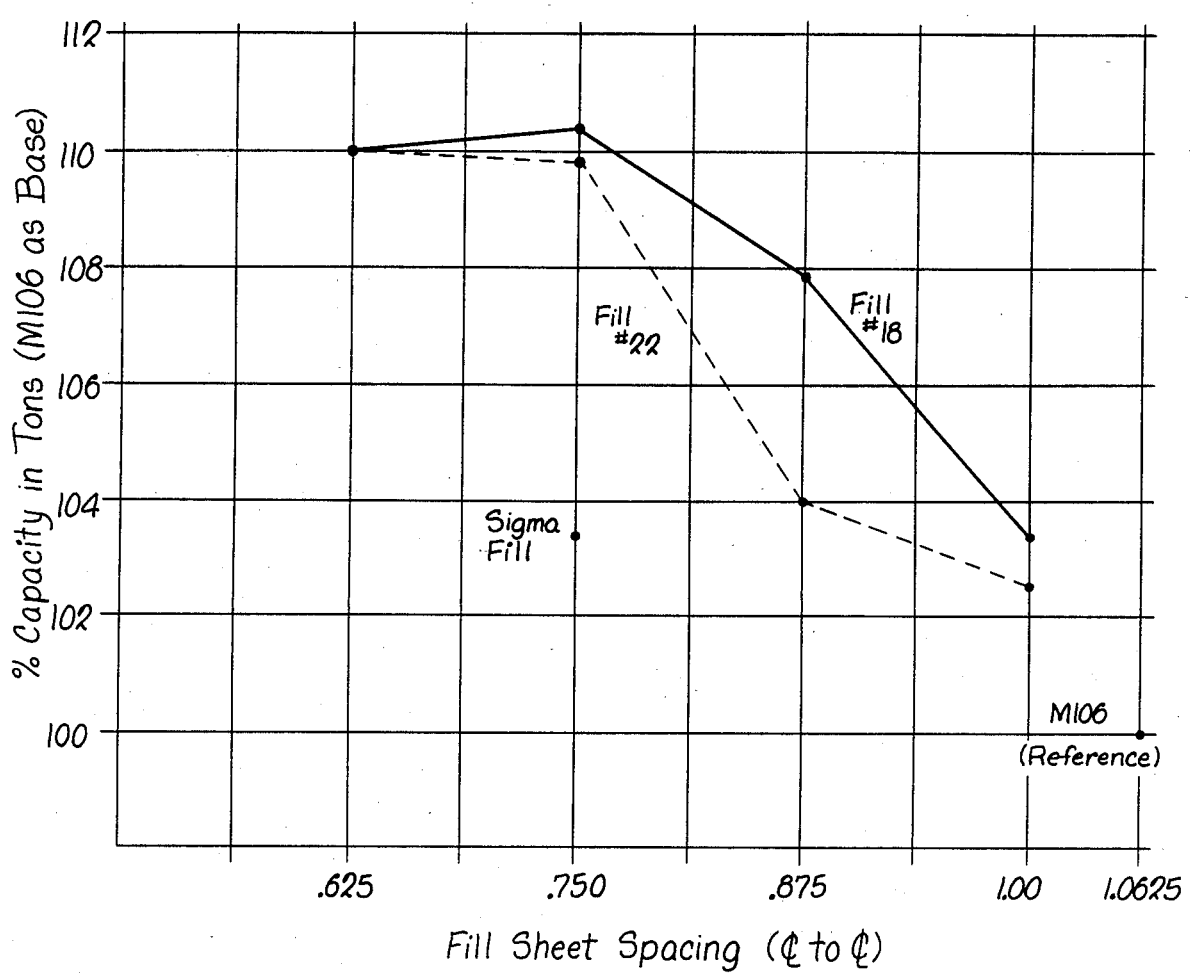
FIG. 10 is a graphical representation of fill design and spacing of the fill sheets in relationship to the cooling capacity wherein film fill sheets embodying the present invention are compared with the cooling capacity of prior chevron film fills used in crossflow water cooling towers.

The results of these comparative studies are graphically illustrated in FIG. 10 which plots fill design and spacing versus cooling capacity. In the graph, the X axis of the coordinate system represents fill sheet spacing on a center-to-center basis of the various film fill packs plotted. The Y axis represents the percent of capacity in tons of refrigeration utilizing the results obtained employing the M-106 Fill as a base. The points plotted in the graph of FIG. 10 represent the relative cooling capacity of a cooling tower equiped with each of the fill sheets of the types indicated in Table I and at the fill sheet spacing set out in the graphical representation. The cooling capacity as plotted is reflected in terms of the relative refrigerant condensing capability of the subject cooling tower embodying respective fill packs as referenced in Table I using emperically determined thermal and pressure drop characteristics of each of the fills, the pressure drop characteristics of the remainder of the tower with such fills installed, and the air moving characteristics of the fan used in the tower when operated with each of the fills in place therein. The water rate in all cases varies with the cooling capacity and is directly proportional to such capacity. since the fan and fan horsepower are constant functions and the air rate varies only as influenced by the overall pressure drop characteristics of the cooling tower with a particular fill installed and its effect on the air delivery capability of the fan.

For example, referring to the Sigma Fill compared to Fill #18 and #22 as disclosed herein and all located at the same relative sheet spacing (¾ inch and thereby having the same fill cost), a 6+% increase in cooling capacity was obtained. Even though a greater number of fill sheets 38 were employed in the fill packs of Fill #18 and #22 as compared with the M-106 Fill used as a base point in the graph of FIG. 10, the improvement in cooling capacity on a value engineering basis is still at least as great as the difference found between the Sigma Fill and types #18 and #22 at the same ¾ inch sheet spacing.

We claim:

1. A film fill pack for water cooling towers comprising, a series of thin, integral, generally parallel, side-by-side spaced sheets of material adapted for film flow of water to be cooled thereover, said sheets each being formed in a repeating chevron pattern to present a series of zig-zag, serpentine, spaced ridges on opposed faces of the sheet which define respective complementally configured zig-zag grooves between each adjacent pair of ridges, the ridges on one face of each sheet defining the grooves on the opposite face thereof and vice versa, said ridges each being made up of a series of end-to-end triangular sections alternately facing in opposite directions and having corresponding diverging leg segments which present a respective interior acute angle therebetween, the ridges and thereby the grooves therebetween being of generally triangular configuration transversely thereof, the distance from the outermost portions of one face of each formed sheet to the outermost portions of the opposed face of the respective sheet (out-to-out dimension) being in the range of about 0.18 inch to about 0.30 inch, the lift of the zig-zag pattern, i.e. the distance from the zone of merger of two ridge leg segments facing in one direction to the next adjacent zone of merger of two ridge segments of the same ridge and facing in the same direction being from about 1 to about 2 inches, the interior acute angle defined by diverging leg segments of each triangular ridge section of each zig-zag ridge being within the range of about 50° to about 70°, the included angle between the surfaces of each ridge and thereby each groove transversely thereof being within the range of about 60° to about 90°, and the center-to-center spacing between adjacent sheets being in the range of about ½ inch to about 1 inch.

2. A film fill pack as set forth in claim 1, wherein said interior angle between the leg segments of each triangular ridge section is about 60°.

3. A film fill pack as set forth in claim 2, wherein said included angle between the surfaces of each ridge and thereby each groove transversely thereof is about 77½°.

4. A film fill pack as set forth in claim 3, wherein said lift is about 1.2 inches.

5. A film fill pack as set forth in claim 3, wherein said lift is about 1.8 inches.

6. A film fill pack as set forth in claim 3, wherein said out-to-out dimension is about 0.25 inch.

7. A film fill pack as set forth in claim 3, wherein said out-to-out dimension is about 0.2 inch.

8. A film fill pack as set forth in claim 1, wherein each sheet is of a thermoplastic, synthetic resin material of a thickness facilitating vacuum forming thereof at an elevated temperature.

9. A film fill pack as set forth in claim 8, wherein said sheet material is of a thickness within the range of about 10 mils to about 30 mils.

10. A film fill pack as set forth in claim 9, wherein said sheet material is of a thickness of about 15 mils.

11. A film fill pack as set forth in claim 1, wherein the leg segments of each triangular section of said ridges merge at the interior acute angle zone thereof in the form of an arcuate line which results in generally flat, arrow-shaped planar areas being defined at the apex of each triangular section which serve to increase the rigidity of the formed sheet at each of the ridge triangular section apexes.

12. A film fill pack as set forth in claim 1, wherein adjacent sheets are spaced apart on a center-to-center basis a distance of about ¾ inch.

13. A film fill pack as set forth in claim 1, which is of three-dimensionally polygonal shape and wherein the ridges and grooves of each sheet are oriented such that the ridges extend in continuous zig-zag lines from respective adjacent opposed extremities of the pack which constitute the upper and lower edges of the pack in normal use thereof in a water cooling tower.

14. A film fill sheet for water cooling towers comprising, a thin, integral, indulating sheet of material adapted for film flow of water to be cooled thereover, said sheet being provided with a series of spaced, outwardly directed, integral sheet spacers for maintaining adjacent sheets in predetermined spaced, generally parallel relationship, each of said spacers having inclined wall surfaces located in relative disposition causing the spacers to be generally W-shaped transversely thereof, the outer V defining wall surfaces of the spacers extending outwardly from the plane of the ridges on one face of the sheet while the intermediate inverted V defining wall surfaces of the spacers extend outwardly beyond the plane of the opposed face of the sheet, the intermediate inverted V defining wall surfaces of the spacers each being provided with spaced, inwardly directed notch means in the outer margin thereof positioned to complementally receive the outer margins of the outer V-defining wall surfaces of another of said spacers of an adjacent fill sheet.

15. A film fill sheet as set forth in claim 14, wherein the wall surfaces of the intermediate inverted V of the spacers are of a length in a direction parallel to the outer margin of such surfaces defined by the merger thereof, greater than the distance between the outer margins of the surfaces defining said outer V wall surfaces at the zones of merger thereof.

16. A film fill sheet as set forth in claim 14, wherein said wall surfaces are of generally planar configuration.

17. A film fill sheet as set forth in claim 14, wherein is provided integral, transversely extending, triangular end wall panels closing opposed extremities of the intermediate, inverted V defining wall surfaces.

18. A film fill sheet as set forth in claim 14, wherein said wall surfaces are oriented at no greater than an acute angle with respect to the path of air directed through a cooling tower in which the fill sheet is located for bringing hot water to be cooled into heat exchange relationship to the air for effecting evaporative cooling of such water.

19. A film fill sheet as set forth in claim 14 wherein said spacers are positioned such that the notch bearing margins of the spacers are located at no greater than an acute angle with respect to the path of air directed through a cooling tower in which the fill sheet is located for bringing hot water to be cooled into heat exchange relationship to the air for effective evaporative cooling of such water.

20. A film fill sheet as set forth in claim 19, wherein adjacent spacers are positioned such that said notch bearing margins of the spacers are oriented in opposite acute angle inclined directions with respect to the path of air flowing therepast in said cooling tower.

* * * * *